United States Patent
Emmert et al.

(10) Patent No.: US 11,719,600 B2
(45) Date of Patent: Aug. 8, 2023

(54) DEVICE AND METHOD FOR MONITORING THE USE OF A MACHINE COMPONENT

(71) Applicant: AKTIEBOLAGET SKF, Gothenburg (SE)

(72) Inventors: Michael Emmert, Willmars (DE); Sebastian Ziegler, Bamberg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 8 days.

(21) Appl. No.: 17/206,619

(22) Filed: Mar. 19, 2021

(65) Prior Publication Data
US 2021/0310903 A1   Oct. 7, 2021

(30) Foreign Application Priority Data

Apr. 6, 2020   (DE) .......................... 102020204425.2

(51) Int. Cl.
*G01M 13/045*   (2019.01)
(52) U.S. Cl.
CPC ....... *G01M 13/045* (2013.01); *F16C 2233/00* (2013.01)
(58) Field of Classification Search
CPC . G01M 13/045; G01M 13/04; F16C 2233/00; F16C 19/52; F16C 41/008; G07C 3/00; G01D 21/02
See application file for complete search history.

(56) References Cited

U.S. PATENT DOCUMENTS

| 4,405,829 | A | 9/1983 | Rivest et al. |
| 2005/0246150 | A1* | 11/2005 | Shiromaru ............. G01H 1/003 703/7 |
| 2011/0051558 | A1* | 3/2011 | Janssen .................... G07C 3/00 368/1 |
| 2018/0022340 | A1* | 1/2018 | Hill .......................... B60L 1/02 180/65.265 |
| 2018/0039789 | A1* | 2/2018 | Sanchez ................. H04L 63/145 |
| 2021/0073878 | A1 | 3/2021 | Emmert et al. |

OTHER PUBLICATIONS

"Public-key cryptography"—Wikipedia; https://en.wikipedia.org/wiki/Public-key_cryptography; pp. 1-7; Page last edited on Mar. 15, 2021, retrieved Mar. 17, 2021.
(Continued)

*Primary Examiner* — Natalie Huls
*Assistant Examiner* — Cynthia L Davis
(74) *Attorney, Agent, or Firm* — J-Tek Law PLLC; Scott T. Wakeman; Mark A. Ussai

(57) ABSTRACT

A device for monitoring the use of a machine component includes a sensor configured to measure at least one operating parameter of the machine component and produce a first output signal indicative of the measured operating parameter, a control unit configured to determine information about a use of the machine based on the received first output signal and to produce a second output signal indicative of the use of the machine, and a service unit configured to receive the second output signal and to permit a continuation of existing services for the machine component and/or to provide further services for the machine component based on the second output signal.

14 Claims, 1 Drawing Sheet

(56) References Cited

OTHER PUBLICATIONS

"RSA (cryptosystem)"—Wikipedia; https://en.wikipedia.org/wiki/RSA_(cryptosystem); pp. 1-18; Page last edited on Mar. 12, 2021, retrieved Mar. 17, 2021.
"Transport Layer Security"—Wikipedia; https://en.wikipedia.org/wiki/Transport_Layer_Security; pp. 1-37; Page last edited on Mar. 17, 2021, retrieved Mar. 17, 2021.
Unpublished U.S. Appl. No. 17/029,140.

\* cited by examiner

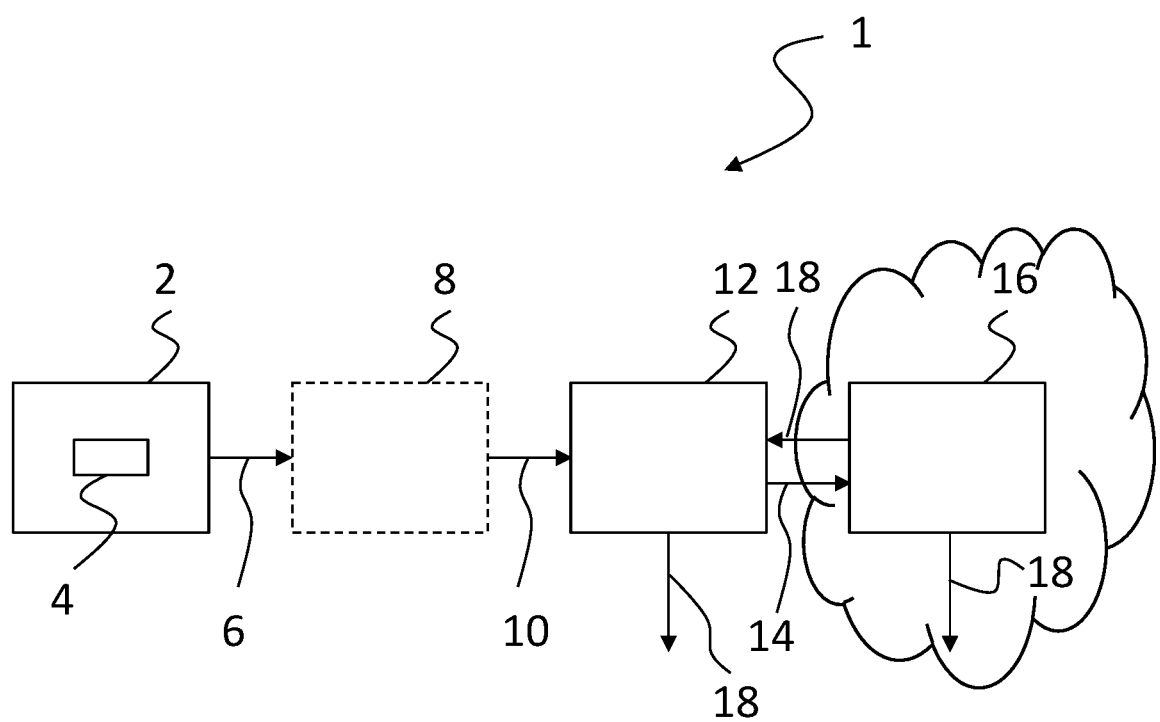

DEVICE AND METHOD FOR MONITORING THE USE OF A MACHINE COMPONENT

CROSS-REFERENCE

This application claims priority to German patent application no. 10 2020 204 425.2 filed on Apr. 6, 2020, the contents of which are fully incorporated herein by reference.

Technological Field

The present invention relates to a method and device for monitoring the use of a machine component.

BACKGROUND

It is known to use machine components, such as, for example, bearing assemblies, in diverse machines or industrial systems. In order to monitor the state of such machine components and to avoid damage or failures of the overall system in which the components are used, it is known to monitor the machine components via sensors.

In the past, it has been common for a system operator to purchase the respective machine components and install the components and monitors therefore into the system. A full price for the machine component is therefore paid regardless of how much it will actually be used. In addition, a corresponding monitoring system or monitoring unit is purchased and installed, independent of the how much monitoring is actually required and independent of the type of the monitoring, which can, for example, vary over time.

SUMMARY

It is therefore an aspect of the present disclosure to allow a machine component to be monitored based on an actual use of the machine component.

A device for monitoring the use of a machine component, for example, of a bearing assembly in an industrial system or the like, may include a sensor for measuring operating parameters of the machine component. Here the sensor can in particular be disposed directly in or on a machine component.

The device may furthermore include a control unit that is configured to receive the measured operating parameters and to monitor the use of the machine component based on the measured operating parameters. The operating parameters can be, for example, the number of operating hours, the number of revolutions, an angle, a direction of rotation, a temperature, an acceleration, a chemical composition (e.g., of a lubricant), a resistance, a current, a stress, a voltage, a state of the lubricant, etc. From all of these operating parameters it is possible to determine how and how often the machine component is being used as well as an operating status of the machine component.

The sensor that is present in or on the machine component can be, for example, a vibration sensor, a temperature sensor, a current sensor, or the like. Such a sensor can be integrated, for example, in a seal of a bearing or in another bearing component and thus be fixedly connected to the bearing in order to record data regarding use of the bearing. The operating parameters recorded by the sensor can be transmitted to the control unit via a cable, an optical system (such as, for example, an LED, photodiode, or glass fiber), an inductive field (such as, for example, NFC or RFID), or wireless systems (such as, for example, WLAN, etc.)

As soon as the control unit has determined data regarding the use of the machine component, the data is transmitted to a service unit of the device. The service unit can then determine whether to continue to provide existing services and/or whether to provide further services based on the use data. In this way further services can be provided that are based on the actual use and that are only provided based on an actual use of the machine component. If the system, or the device in which the machine component is installed, is currently not being used, for example, no further services may be provided, if desired.

The use of a device as described herein allows a system operator to rent a machine component instead of buying it. The use of the product, i.e., of the machine component, as well as the further services provided under certain circumstances can thus be billed based on actual use and/or the desired scope of services. This enables a so-called pay-per-use model for machine components.

The data regarding use of the machine component can in particular be data regarding a current operating period of the machine component. This means the device can determine how long the machine component is actually in operation. Based on the period of operation, the service unit can continue to provide existing services or to provide further services. For example, if the service unit determines that the current operating period is shorter than or equal to a predefined operating period, it can continue to provide the existing services or provide further services. In contrast, if the service unit determines that the current operating period is longer than the predetermined operating period the existing services or further services can be switched off.

Here the predefined operating period can in particular correspond to a period of time that the operator of the system in which the machine component is installed has purchased as a use period. Here the predefined operating period can be received as an input by a user. If the predefined operating period, for example, the number of operating hours of the machine component that were originally agreed upon, have run out, it is also possible to extend this operating period by a user entry. For this purpose the operator of the system can receive access data from the manufacturer of the machine component, which access data enable the operator to use the further services beyond the originally agreed upon period of time.

Furthermore, it is possible that the service unit provides the further services in a cascading manner based on authorization information. In this way it is possible that the operator of the system receives access data from the manufacturer of the machine component in order to both extend the operating period and to be able to book or cancel further services again as needed. These access data are transmitted to the service unit as authorization information in order to thus make possible a pay-per-use operation.

The further services can be, for example, access to the operating parameters, damage monitoring, maintenance, or performance monitoring. For example, the operator of the system can decide the desired scope of further services, and they are then correspondingly channeled through the service unit and provided by the pay-per-use contracting partner.

The further services can be offered, for example, in different levels. An example of such a cascading service is described in the following. However, it should be noted that other classifications are also possible.

In this example an overall vibration or damage detection is offered in Level 1. Here the manufacturer of the machine component can output a so-called traffic-light warning (green-yellow-red), depending on the result of the vibration or damage detection. This indicates whether the machine component is damaged, or not, or whether a replacement is required.

In Level 2 a further frequency analysis can be carried out with more detailed damage detection for forecasting maintenance in order to extend the service life of the system. In addition to the detection, in this case maintenance can also be offered directly by the pay-per-use contracting partner.

In Level 3 not only is the monitoring and analysis carried out, but this information is also issued to the system operator, wherein in particular performance indicators, i.e., information about the current performance of the machine component, can be issued to the operator of the system.

The communication between the sensor, the control unit, and/or the service unit can be encrypted. In particular, asymmetric encryption with private keys and public keys can be used as encryption. By providing the corresponding private and public keys, it is also possible to adapt the provision of the further services or the predefined operating period.

The service unit can, for example, send an encrypted message with configuration data to the control unit, wherein initially agreed on keys are used. The control unit can decrypt this message and process the instructions contained therein for generating a new key pair including an expiration date (for example, a number of operating hours). The control unit can thus extract the predefined operating period from the received message. The control unit can use the new key pair for encrypted communication with the service unit. After the expiration date the keys are invalid and the control unit cannot carry out further communication with the service unit.

The initially used key pairs remain valid, so that afterwards the control unit can receive an encrypted message from the service unit in order to extend the predefined operating period and receive new key pairs. In this embodiment it is thus provided that the service unit and the control unit initially communicate using a previously agreed upon key pair, via which the predefined operating period as well as the scope of the further services provided can be accommodated. The operator of the system can request from the manufacturer of the system or of the machine component, for example, an extension of the operating period or a modification of the scope of the further services provided, whereupon the service unit transmits a new key to the control unit. Using the new key, the correspondingly adapted further services can then be used. The newly transmitted keys again contain an expiration date or a predefined operating period, so that after the expiration of this newly predefined operating period the keys are again invalid and the control unit can no longer communicate with the service unit within the scope of the further services.

The service unit can be disposed remotely from the control unit, e.g., be formed in the cloud, or integrally with the control unit. In each case the control unit can communicate with the service unit in order to be able to exchange the determined use of the machine component as well as the provision of the further services between the two units.

If the service unit is provided integrally with the control unit, a change to the predefined operating period or the provision of the further services can be effected via a locally available file or message instead of by communication with the service unit. For this purpose a USB stick, for example, can contain a corresponding message or file, and the USB stick can be introduced into the service unit in order to transfer the message from the USB stick to the service unit. This message can then in turn be used to carry out the adapting of the provision of the further services or the adapting of the predefined operating period. Also in this case an expiration date can be present in the message, which expiration date corresponds to the predefined operating period, wherein after the expiration of this predefined operating period the provision of the further services is in turn switched off. An extension of the predefined operating period can be carried out as described above, locally or via communication with the service unit.

According to a further aspect, a method is proposed for monitoring the use of a machine component. The method includes the following steps: measuring operating parameters of the machine component, receiving the measured operating parameters, monitoring the use of the machine component based on the measured operating parameters, and providing further services based on usage.

Another aspect of the disclosure comprises a device for monitoring the use of a machine component that includes a sensor configured to measure at least one operating parameter of the machine component and produce a first output signal indicative of the measured operating parameter, a control unit configured to determine information about a use of the machine based on the received first output signal and to produce a second output signal indicative of the use of the machine, and a service unit configured to receive the second output signal and to permit a continuation of existing services for the machine component and/or to provide further services for the machine component based on the second output signal. For example, the sensor could be a vibration sensor, the existing services could comprise damage detection based on the first output signal, and the further services could comprise a frequency analysis of the first output signal.

The embodiments and features described for the proposed device correspondingly apply for the proposed method.

Furthermore, a computer program product is proposed that includes a program code that is configured to trigger the carrying out of the method, as explained above, on a computer.

A computer program product, such as, for example, a computer program medium, can be provided or delivered as a storage medium, such as, e.g., storage card, USB stick, CD-ROM, DVD, or also in the form of a downloadable file from a server in a network. This can be effected, for example, in a wireless communication network by the transmission of a corresponding file including the computer program product or the computer program means.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail based on exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE FIGURE

FIG. 1 is a schematic block diagram of a device for monitoring the use of a machine component according to an embodiment of the present disclosure.

DETAILED DESCRIPTION

In the following, identical or functionally equivalent elements are designated by the same reference numbers.

FIG. 1 shows a device 1 for monitoring the use of a machine component 2. The machine component 2 can be, for example, a bearing or the like in an industrial system or another device.

A sensor 4 is disposed in the machine component 2. For example, here it can be a sensor that is fixedly installed in a seal of a bearing in order to record the use of the bearing. If the machine component 2, for example, the bearing, is used, the sensor 4 can record various operating parameters, such as, for example, the number of revolutions of one of the bearing rings, the operating hours, vibrations, temperature, acceleration, etc.

Depending on the type of the sensor 4 (wherein a plurality of sensors 4 can also be used), the corresponding sensor data can be recorded and transmitted as raw sensor data 6 to an optional sensor processing unit 8. The sensor processing unit 8 can be used to convert the raw sensor data into processed sensor data 10, for example, in order to transfer more precise information about the operating parameters of the machine component 2. The processed sensor data 10 are transmitted to a control unit 12. Alternatively the sensor processing unit 8 can also be directly integrated in the control unit 12.

The control unit 12 is configured to determine information 14 about the use of the machine component 2 based on the sensor data. The information 14 can relate, for example, to a current operating period, for example a length of the current operating period in hours, for example. This information 14 regarding the use of the machine component 2 is then transmitted to a service unit 16 by the control unit 12.

The service unit 16 can either be disposed integrally with the control unit 12 or can, as is shown here, be disposed remotely from the control unit 12, for example, in the cloud. In this case the communication between the control unit 12 and the service unit 16 can preferably be effected via radio.

The service unit 16 can provide further services based on the transmitted information 14 regarding use. These further services 18 can either be provided directly by the service unit, or they can be obtained the control unit 12. For example, when an operator of the machine component 2 has paid for vibration monitoring and later wishes to have a frequency analysis performed on the data transmitted to the service unit 16 (and pays for this additional service), the service unit 16 can perform the requested frequency analysis and transmit the results back to the control unit 12. Alternately, when an operator of the machine component 2 wishes to obtain access to data collected from the machine component 2 (and pays for access to this data), the service unit can send a signal to the control unit 12 to make this data, stored on the control unit 12, accessible to the machine operator. For providing the further services 18, the service unit 16 can use the information regarding use 14 of the machine component 2 as well as the sensor data 10, and carry out in the service unit 16 additional functions, such as, for example, damage detection. This processing can then be passed on to the control unit as further services 18, in this case as additional information.

The communication between the control unit 12 and the service unit 16 can be effected in an encrypted manner. In particular, it is possible here that after the expiration of a predefined operating period, i.e., when the machine component 2 has been used longer than previously authorized, the keys used for encrypted communication become invalid and no further communication is possible with respect to the further services. If an extension of the predefined operating period is requested or ordered by the operator, the service unit 16 can transmit a new key to the control unit 12 in order to make access possible again to the further services.

The device disclosed herein makes it is possible to make available, in a simple manner depending on the need and scope of the use of a machine component, further functions or services for this machine component.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved devices and methods for monitoring a use of a machine component.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Device
2 Machine component
4 Sensor
6 Raw sensor data
8 Sensor processing unit
10 Processed sensor data
12 Control unit
14 Information regarding use
16 Service unit
18 Further services

What is claimed is:

1. A device for monitoring the use of a machine component, comprising:
  a sensor configured to measure at least one operating parameter of the machine component and produce a first output signal indicative of the measured operating parameter,
  a control unit configured to determine information about a use of the machine based on the received first output signal and to produce a second output signal indicative of the use of the machine, and
  a service unit configured to receive the second output signal and to permit a continuation of existing data analysis and/or data access services for the machine component and/or to provide further data analysis and/or data access services for the machine component based on the second output signal.

2. The device according to claim 1, wherein the use of the machine comprises a length of a current operating period of the machine component.

3. The device according to claim 2,
wherein the service unit is configured to provide the existing data analysis and/or data access services as long as the current operating period is shorter than or equal to a predefined operating period, and
wherein the service unit is configured to switch off the existing data analysis and/or data access services in response to the current operating period exceeding the predefined operating period.

4. The device according to claim 3, wherein the service unit is configured to receive the predefined operating period as user entry.

5. The device according to claim 1, wherein the service unit is configured to provide the further data analysis and/or data access services in a cascading manner based on authorization information.

6. The device according to claim 1,
wherein the further data analysis and/or data access services include access to the operating parameters, damage monitoring, maintenance, and/or performance monitoring.

7. The device according to claim 1, wherein the communication between the sensor, the control unit, and/or the service unit is encrypted.

8. The device according to claim 7, wherein the encryption is asymmetric encryption.

9. The device according to claim 1, wherein the service unit is disposed remotely from the control unit, or wherein the service unit is formed integrally with the control unit.

10. The device according to claim 1,
wherein the service unit is configured to discontinue existing data analysis and/or data access services for the machine component based on the second output signal.

11. The device according to claim 1,
wherein the service unit is configured to provide further data analysis and/or data access services for the machine component based on the second output signal.

12. A device for monitoring the use of a machine component, comprising:
a sensor configured to measure at least one operating parameter of the machine component and produce a first output signal indicative of the measured operating parameter,
a control unit configured to determine information about a use of the machine based on the received first output signal and to produce a second output signal indicative of the use of the machine, and
a service unit configured to receive the second output signal and to permit a continuation of existing services for the machine component and/or to provide further services for the machine component based on the second output signal,
wherein the sensor is a vibration sensor,
wherein the existing services comprise damage detection based on the first output signal, and
wherein the further services comprise a frequency analysis of the first output signal.

13. A method for monitoring the use of a machine component, comprising:
measuring at least one operating parameter of the machine component,
producing a first output signal indicative of the at least one operating parameter,
determining a use of the machine component based on the first output signal,
determining whether to discontinue a provision of existing data analysis and/or data access services for the machine component based on the determined use, and
determining whether to provide further data analysis and/or data access services based on the determined use.

14. A device for monitoring the use of a machine component, comprising:
a sensor configured to measure at least one operating parameter of the machine component and produce a first output signal indicative of the measured operating parameter,
a control unit configured to determine information about a use of the machine based on the received first output signal and to produce a second output signal indicative of the use of the machine, and
a service unit configured to receive the second output signal and determine whether to prevent a continuation of existing data analysis and/or data access services for the machine component and whether to make available or provide further data analysis and/or data access services for the machine component based on the second output signal.

* * * * *